United States Patent
Kim et al.

(10) Patent No.: US 9,715,557 B2
(45) Date of Patent: Jul. 25, 2017

(54) SYSTEM, DEVICE AND METHOD FOR PROVIDING CONTEXT SENSITIVE CONTENT ON A COMPUTING DEVICE

(75) Inventors: Sang-Heun Kim, Mississauga (CA); Yoojin Hong, Redwood City, CA (US); Charles Laurence Stinson, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 811 days.

(21) Appl. No.: 12/413,919

(22) Filed: Mar. 30, 2009

(65) Prior Publication Data
US 2010/0146383 A1    Jun. 10, 2010

Related U.S. Application Data

(60) Provisional application No. 61/120,986, filed on Dec. 9, 2008.

(51) Int. Cl.
*G06F 17/00* (2006.01)
*G06F 17/30* (2006.01)
(Continued)

(52) U.S. Cl.
CPC .... *G06F 17/30905* (2013.01); *G06F 17/2247* (2013.01); *G06F 17/3089* (2013.01); *G06F 17/30899* (2013.01); *G06Q 30/02* (2013.01)

(58) Field of Classification Search
CPC ........... G06F 17/2217; G06F 17/30905; G06F 17/30899; G06F 17/3089; G06Q 30/02
(Continued)

(56) References Cited

U.S. PATENT DOCUMENTS 5,583,983 A     12/1996  Schmitter
5,995,102 A  *  11/1999  Rosen et al. ................. 715/856
(Continued)

FOREIGN PATENT DOCUMENTS

EP    1736878 A    12/2006
GB    2354854 A     4/2001
(Continued)

OTHER PUBLICATIONS

No Author, NoScript, Oct. 30, 2007, Inform Action Open Source Software. Retrieved from http://replay.web.archive.org/20071030202355/http://noscript.net/ and http://replay.web.archive.org/20071027064514/http://noscript.net/faq.*

(Continued)

*Primary Examiner* — Quoc A Tran
(74) *Attorney, Agent, or Firm* — Fleit Gibbons Gutman Bongini & Bianco P.L.

(57) ABSTRACT

A system, device and method for providing context sensitive content on a computing device is provided. In an embodiment, a computing device in the form of a portable computing device is configured to execute a primary web-browser application and a secondary web-browser application. The primary web-browser application is configured to generate a web-page containing context sensitive items and receiving focus on one of the context sensitive items. The secondary web-browser application is configured to generate the context sensitive content related to the one of the context sensitive items.

25 Claims, 13 Drawing Sheets

(51) Int. Cl.
*G06F 17/22* (2006.01)
*G06Q 30/02* (2012.01)

(58) Field of Classification Search
USPC ....... 715/802, 796, 783, 772, 808, 809, 812, 715/745, 821
See application file for complete search history.

(56) References Cited

U.S. PATENT DOCUMENTS

| | | | |
|---|---|---|---|
| 6,295,061 B1 * | 9/2001 | Park et al. | 715/764 |
| 6,828,988 B2 * | 12/2004 | Hudson et al. | 715/711 |
| 6,882,825 B2 * | 4/2005 | Hopkins et al. | 434/350 |
| 6,904,569 B1 | 6/2005 | Anderson | |
| 7,032,036 B2 * | 4/2006 | Linsley | 709/250 |
| 7,320,107 B2 * | 1/2008 | Chwa | 715/738 |
| 7,376,913 B1 | 5/2008 | Fleck et al. | |
| 2001/0077032 | 3/2001 | Correale et al. | |
| 2002/0054161 A1 | 5/2002 | Durham | |
| 2002/0065842 A1 | 5/2002 | Takagi et al. | |
| 2002/0095522 A1 * | 7/2002 | Hayko | G06F 8/60 719/311 |
| 2002/0133540 A1 | 9/2002 | Sears, Jr. et al. | |
| 2003/0020747 A1 | 1/2003 | Korala | |
| 2003/0088716 A1 | 5/2003 | Sanders | |
| 2004/0027373 A1 | 2/2004 | Jacquot et al. | |
| 2004/0073626 A1 * | 4/2004 | Major et al. | 709/217 |
| 2004/0199603 A1 * | 10/2004 | Tafla et al. | 709/217 |
| 2005/0132286 A1 * | 6/2005 | Rohrabaugh et al. | 715/523 |
| 2005/0138633 A1 * | 6/2005 | Barsade | G06Q 30/02 719/313 |
| 2006/0064411 A1 * | 3/2006 | Gross et al. | 707/3 |
| 2006/0143568 A1 * | 6/2006 | Milener et al. | 715/738 |
| 2007/0028303 A1 | 2/2007 | Brennan | |
| 2007/0113237 A1 | 5/2007 | Hickson | |
| 2007/0180148 A1 | 8/2007 | Yadidian | |
| 2007/0206221 A1 | 9/2007 | Wyler et al. | |
| 2007/0208834 A1 | 9/2007 | Nanamura et al. | |
| 2008/0071857 A1 * | 3/2008 | Lie | 709/203 |
| 2008/0077880 A1 * | 3/2008 | Oygard | 715/799 |
| 2008/0178098 A1 | 7/2008 | Yoon et al. | |
| 2008/0256485 A1 | 10/2008 | Krikorian | |
| 2008/0288515 A1 | 11/2008 | Kim et al. | |
| 2009/0013085 A1 | 1/2009 | Liberman Ben-Ami et al. | |
| 2009/0064020 A1 | 3/2009 | Morris | |
| 2010/0070872 A1 * | 3/2010 | Trujillo | G06F 3/04892 715/745 |
| 2010/0192185 A1 | 7/2010 | Margulis | |
| 2010/0306642 A1 * | 12/2010 | Lowet | G06F 17/30873 715/234 |
| 2011/0014934 A1 | 1/2011 | Rybak et al. | |
| 2012/0054593 A1 | 3/2012 | Naderi | |
| 2012/0131440 A1 * | 5/2012 | Rodorff | G06F 19/324 715/234 |

FOREIGN PATENT DOCUMENTS

| | | | |
|---|---|---|---|
| KR | 1020070119151 A * | 12/2007 | |
| WO | 0186462 A1 | 11/2001 | |
| WO | 2004109557 A1 | 12/2004 | |
| WO | 2008098174 A | 8/2008 | |
| WO | WO2008141424 A1 * | 11/2008 | |

OTHER PUBLICATIONS

Mills, Chris, Differences between Opera Mini 3 and 4, Nov. 7, 2007, Dev.Opera. Retrieved from http://dev.opera.com/articles/view/differences-between-opera-mini-3-and-4/.*

No Author, Nokia Announces the Nokia WAP Browser, Jun. 30, 1999. Retrieved from http://www.wapforum.org/new/Nokia6_30_99.htm.*

Microsoft Corporation, Microsoft Computer Dictionary, 2002, Microsoft Corporation, 5th Edition, p. 230.*

Vander Veer, Emily; JavaScript for Dummies; 2005; Wiley Publishing Inc.; Fourth Edition; pp. 168-180.* eddiebauer.com, http://www.eddiebauer.com/EB/Women/Outerwear-Jackets--Blazers/index.cat#ppl={type%3A%22hide%22}, Mar. 30, 2009.

Anonymous: "Products—Cookie Editor" (www.proxoft.com), Apr. 10, 2008 (Apr. 10, 2008), XP002567470, Retrieved from Internet: URL:http://web.archive.org/web/20080410221756/http://www.proxoft.com/CookieEditor.asp> [retrieved on Feb. 9, 2010].

Anonymous: "ieview.mozdev.org" Internet Citation, [online] XP002404341, Retrieved from the Internet: URL:http://web.archive.org/web/20050306004931/ieview.mozdev.org/> [retrieved on Oct. 23, 2006].

Geijtenbeek Van R.: "Re: way to re-open (while in opera) in IE?—Message-ID: ,opsh91p3ne55487ualphanuta5-xp.oslo.opera.com>" Internet Citation, [Online] XP002404340, Retrieved from the Internet: URL:http://groups.google.com/group/opera.general/msg/3ff9c0c5a75984b5?dmode=source&output=gplain> [retrieved on Oct. 25, 2006].

Extended European Search Report for corresponding European Application No. 10158517.2-1527 dated Jun. 28, 2010.

Wittenburg, K. et al, "visual Focusing and transition techniques in a treeviewer for Web information access", 1997 IEEE, pp. 20-27.

Extended European Search Report for related European Application No. 08748301.2 dated Dec. 30, 2010.

International Business Machines Corporation, Web site substitution (Research Disclosure Database No. 421083/Journal No. 42183) May 1999, Kenneth Mason Publications Ltd.

International Business Machines Corporation, Notebook views within web pages (Research Disclosure Database No. 433111), May 2000, Kenneth Mason Publications Ltd.

Microsoft Corporation, Microsoft Computer dictionary, 2002, Microsoft Corporation Fifth Edition, pp. 147-148, 328, 596, 710, 726.

No author; The Ultimate White Pages, Feb. 6, 2003, theultimates.com; originally available at http:www.theultimates.com/white/; retrieved from http://replay.waybackmachine.org/20030206053402/http://www.theultimates.com/white/.

Rick, Nintendo DS Fact Sheet, Aug. 2004, GameCubicle.com. Retrieved from URL http://www.gamecubicle.com/hardware-nintendo_ds_spec_sheet.htm.

No author; Nintendo DS Instruction Booklet, 2005, Nintendo of America Inc. Retrieved from http://www.nintendo.com/consumer/downloads/ds_english.pdf.

No author; Giving Gamers Two Windows to the Web: The Opera Browser for Nintendo DS, Feb. 15, 2006, Opera Press Releases. Retrieved from http://www.oprea.com/press/releases/2006/02/15/.

No author; OYSTR user guide, 2006, Kyocera Wireless Corp., p. 15. Retrieved from http://www.kyocera-wireless.com/oystr-phone/pdf/oystr_user_guide_english.pdf.

Opera Software ASA, Nintendo DS Browser Instruction Booklet, 2006, Nintendo of America Inc. Retrieved from URL http://www.nintendo.com/consumer/downloads/DSBrowser.pdf.

Heitmeyer, David P.; CSCI E-153, Web Development Using XML—XForms, XQuery, Dec. 12, 2006. Retrieved from http://cscie153.dce.harvard.edu/lecture_notes/2006/20061212/handout.html.

Mills, Chris; Difference Between Opera Mini 3 and 4; Nov. 7, 2007, Dev.opera. Retrieved from http://dev.opera.com/articles/view/differences-between-opera-mini-3-and-4/.

Prasad H.; TextBox Validation, Nov. 18, 2007, C# Help. Originally available from http://www.csharphelp.com/archives/archive64.html; retrieved from http://replay.waybackmachine.org/20071118151351/http://www.csharphelp.com/archives/archive64.html.

No author; JavaScript Credit Card Validation Function; Nov. 28, 2007, Braemoor Software Freebies. Originally available at http://www.breamoor.co.uk/software/creditcard.shtml; retrieved from http://www.replay.waybackmachine.org/20071128064326/http://www.breamoor.co.uk/software/creditcard.shtml.

No author; EPA Environmental Information Exchange Network & Grant Program Glossary; May 28, 2008, EPA. Originally available at http://www.epa.gov/exchangenetwork/glossary.html; this version

(56) References Cited

OTHER PUBLICATIONS retrieved from http://replay.waybackmachine.org/20080328062837/http://www.epa.gov/exchangenetwork/glossary.html.
IBM, A Multi-Browser framework for Portal Solutions, Feb. 25, 2004, ip.com Prior Art Database, pp. 1-4. No. IPCOM000022113D retrieved from http://www.ip.com/pubview/IPCOM000022113D.
T. Berners-Lee et al., "Hypertext Markup Language 2.0," IETF Standard, Internet Engineering Task Force, IETF, CH, XP015007650 ISSN: 0000-003; Nov. 1995; 69 pages.
A.S. Tanenbaum, "Computer Networks, 4th Edition," Chapter 7: The Application Layer; 7.3: The World Wide Web; Prentice Hall; 2002; 63 pages.
PHP Developments; Populating Form in Parent Window with Value From Popup Window; Aug. 2003; 2 pages.
Braemoor-JavaScript Credit Card Validation Function; Nov. 2007; 10 pages.

* cited by examiner

SYSTEM, DEVICE AND METHOD FOR PROVIDING CONTEXT SENSITIVE CONTENT ON A COMPUTING DEVICE

CROSS REFERENCE TO RELATED APPLICATION

The present specification claims priority from U.S. Provisional Patent Application No. 61/120,986, filed Dec. 9, 2008. Its contents are incorporated herein by reference.

FIELD

The present specification relates generally to communication technologies and more particularly to a system, device and method for providing context sensitive content on a computing device.

BACKGROUND

Websites optimized for generation using desktop web browsers are generally designed to display all content on a given web-page, with the exception of additional content associated with scripting languages such as dynamic hypertext markup language (DHTML). Such scripting languages may generate additional content ("context sensitive content") in response to input received via the web browser. Indeed, such web-pages originally provide content that is static, in the sense that the content does not change once it is downloaded from a web server and presented on a display. However, certain web-pages include context sensitive content, and when a web-page containing such context sensitive content is downloaded from a web server and generated on the display, the content may change without further input from the web server. A web-page containing context sensitive content may be configured to display a menu of different items within certain contexts. For example, when input representing focus on an item on the web-page is received, (e.g., by placing a pointer over the item), additional content corresponding to the focused item is displayed according to the DHTML. Generation of such additional content may be commonplace in the desktop web browser environment, but mobile computing devices present additional challenges.

DETAILED DESCRIPTION OF THE EMBODIMENTS

Figure 1:
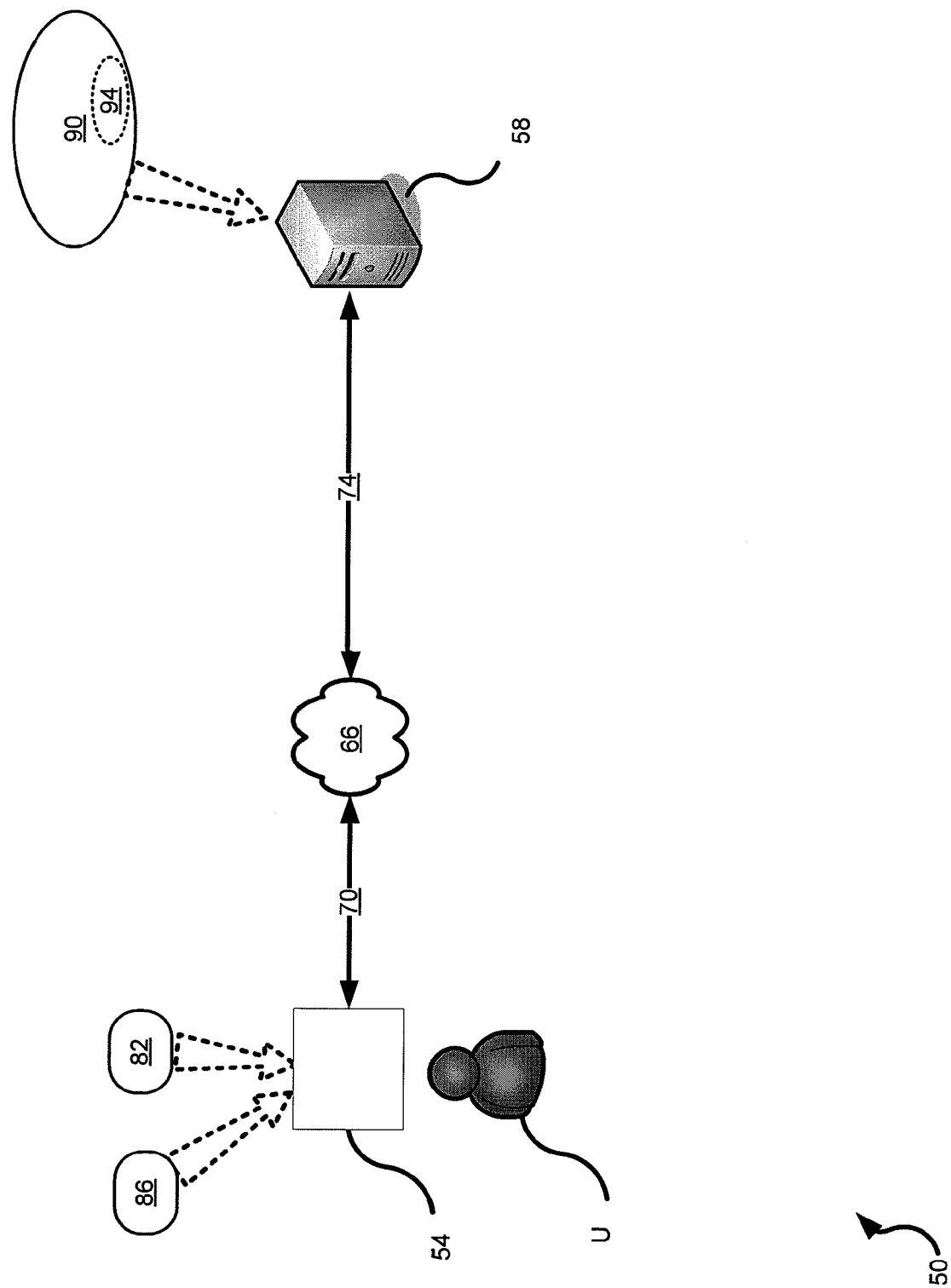
FIG. 1 is a schematic representation of a system for providing context sensitive content on a computing device.

An aspect of the specification provides a portable computing device comprising: storage configured to maintain a primary web-browser application and a secondary web-browser application; at least one processor connected to said storage and configured to execute said primary web-browser application; an interface connected to said processor; said processor configured to access a web-page at a web-server via said interface; said web-page including the context sensitive content related to a plurality of context sensitive items on said web-page; a display connected to said processor; said processor further configured to generate said web-page via said display; an input device connected to said processor; said processor configured to receive focus on one of said plurality of context sensitive items via said input device; and said processor further configured to generate the context sensitive content related to said one of the plurality of context sensitive items on said display via a secondary web-browser application.

The receiving focus may comprise placing a pointer over one of said plurality of context sensitive items.

The receiving focus may comprise placing a pointer over one of said plurality of context sensitive items for a predetermined duration of time.

The receiving of focus may further comprise receiving input from an input device of said computing device.

The context sensitive content may comprise a non-data portion and a data portion. The processor may be configured to generate the context sensitive content using only said data portion. The non-data portion may comprise scripts executable by said primary web-browser application and wherein said processor may be configured to bypass processing of said scripts. The processor may be configured to parse said context sensitive content to extract said data portion. The processor may be configured to access said web-page at said web-server through an intermediate server, and wherein said intermediate server is configured to send a modified version of said web-page.

The modified version of said web-page may not include said non-data portion from said context sensitive content.

The modified version of said web-page may replace said non-data portion with an alternative instruction set comprised of programming instructions inherent to said secondary web-browser application.

The primary web-browser application may be configured to emulate a desk-top browser.

The secondary web-browser application may be optimized for the programming instructions native to said processor.

The secondary web-browser application may be optimized to hardware characteristics associated with a screen size and resolution of said display.

The secondary web-browser application may be optimized to different input devices of said portable computing device.

Another aspect of the specification provides a method of providing context sensitive content on a portable computing device, the method comprising: receiving, at a processor of said portable computing device, a web-page stored on a server; said web-page including context sensitive content related to a plurality of context sensitive items; generating, using said processor, said web-page on a display of said portable computing device using a primary web-browser application; receiving, through an input device connected to said processor, focus on one of said plurality of context sensitive items; and generating, using said processor, the context sensitive content related to said one of the plurality of context sensitive items on the display using a secondary web-browser application.

The receiving focus may comprise placing a pointer over one of said plurality of context sensitive items using said input device.

The receiving focus may comprise placing a pointer over one of said plurality of context sensitive items for a predetermined duration of time using said input device.

The receiving of focus may further comprise receiving further input from an input device of said computing device.

The context sensitive content may comprise a non-data portion and a data portion.

The context sensitive content may be generated using only said data portion.

The non-data portion may comprise scripts executable by said primary web-browser application and wherein said generating the context sensitive content using said secondary web-browser application bypasses processing of said scripts by said primary web-browser application.

The method can further comprise parsing said context sensitive content, using said processor, to extract said data portion.

The web-page may be received through an intermediate server, and wherein said intermediate server is configured to send a modified version of said web-page such that said modified version of said web-page is received as part of said receiving.

The modified version of said web-page may not include said non-data portion from said context sensitive content.

The modified version of said web-page can replace said non-data portion with an alternative instruction set comprised of programming instructions inherent to said secondary web-browser application.

The primary web-browser application may be configured to emulate a desk-top browser.

The secondary web-browser application may be optimized for the programming instructions native to said processor.

The secondary web-browser application may be optimized to hardware characteristics associated with a screen size and resolution of said display.

The secondary web-browser application may be optimized to different input devices of said portable computing device.

Another aspect of the specification provides an intermediate server comprising at least one network interface for connecting to a portable electronic device and a web server via at least one network; a processor connected to said network interface; said processor configured to request a web-page stored on said web server in response to a request for said web-page from said portable electronic device; said web-page comprising context sensitive content; said context sensitive content comprised of a data portion and a non-data portion; said processor further configured to extract said data portion from said context sensitive content from said web-page and to generate a modified version of said web page comprised of said data portion for delivery to said portable electronic device.

The processor of the intermediate server may be further configured to remove said non-data portion from said modified version of said web-page such that said modified version of said web-page consumes less bandwidth than said web-page.

The non-data portion may comprise programming instructions executable by a desktop browser application in order to provide animations, graphics or other rendering instructions. The programming instructions may be scripts comprised of dynamic hyper text markup language or JAVA®.

The data portion may comprise tags, labels, or text.

Another aspect of the specification provides a computer readable storage medium configured to maintain a plurality of programming instructions for a processor of a portable computing device; said processor configured to execute said programming instructions; said programming instructions comprising the method of: receiving a web-page from a server; said web-page including context sensitive content related to a plurality of context sensitive items; generating said web-page on a display using a primary web-browser application; receiving focus on one of said plurality of context sensitive items; and generating the context sensitive content related to said one of the plurality of context sensitive items on the display using a secondary web-browser application.

Referring to FIG. 1, a system for providing context sensitive content on a computing device is indicated generally at 50. In a present embodiment system 50 comprises a first computing device in the form of a client machine 54 and a second computing device in the form of a web server 58. A network 66 interconnects each of the foregoing components. A first link 70 interconnects client machine 54 and network 66. A second link 74 interconnects server 58 and network 66.

Figure 2:
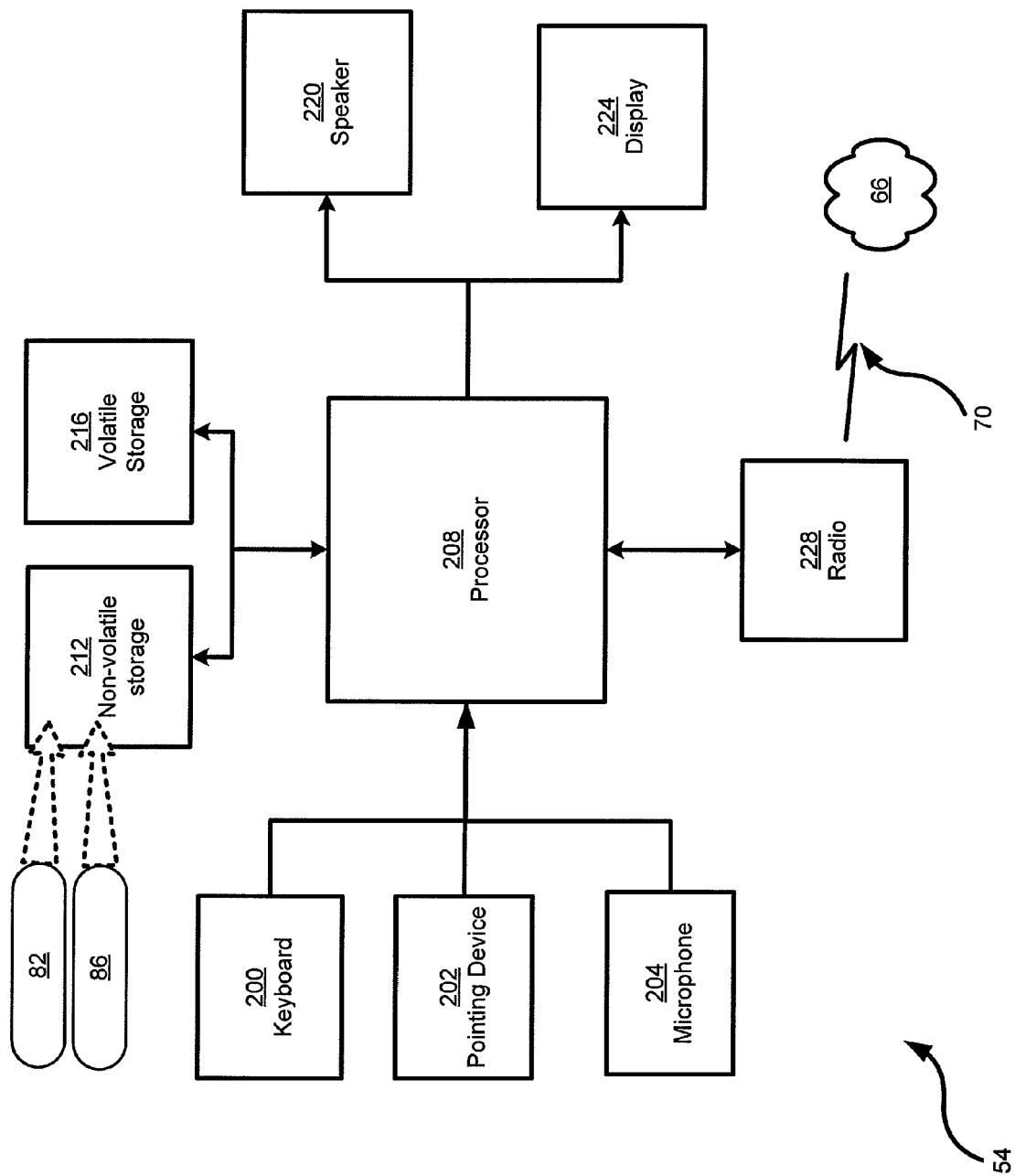
FIG. 2 is a schematic representation of the client machine computing device in FIG. 1.

Referring briefly to FIG. 2, a schematic block diagram shows client machine 54 in greater detail. It should be emphasized that the structure in FIG. 2 is purely exemplary, and contemplates a device that may be used for both wireless voice (e.g. telephony) and wireless data (e.g. email, web browsing, text) communications. (Note that various functionalities such as voice functionality and email functionality are optional). Client machine 54 includes a plurality of input devices which in a present embodiment include a keyboard 200, a pointing device 202 (e.g. a trackwheel, a trackball, or a touch screen) and a microphone 204. Other input devices, such as a camera may optionally be included. Input from keyboard 200 and microphone 204 is received at a processor 208, which in turn communicates with a non-volatile storage unit 212 (e.g. read only memory ("ROM"), Erasable Electronic Programmable Read Only Memory ("EEPROM"), Flash Memory) and a volatile storage unit 216 (e.g. random access memory ("RAM"). It will now be understood by those skilled in the art that non-volatile storage unit 212 and volatile storage unit 216 are non-limiting examples of computer readable storage media. Other examples of computer readable storage media include a removable storage card that may be received in a removable storage card reader that is incorporated into client machine 54 (not shown).

Programming instructions that implement the functional teachings of client machine 54 as described herein are typically maintained, persistently, in non-volatile storage unit 212 and used by processor 208 which makes appropriate utilization of volatile storage 216 during the execution of such programming instructions. Of particular note is that non-volatile storage unit 212 persistently maintains a primary web-browser application 82 and a secondary web-browser application 86, each of which may be executed on processor 208 making use of volatile storage 216 as appropriate. Various other applications (not shown) are maintained in non-volatile storage unit 212 according to the desired configuration and functioning of client machine 54.

Primary web-browser application 82 is configured to perform basic web-browser functionality on client-machine 54. Primary web-browser application 82 may be referred to as a mini-browser, in the sense that it is provided on client machine 54 which has a form factor that is "miniaturized", at least in relation to the form factor of a desk top computer. As will be explained further below, primary web-browser application 82 is configured to re-generate web-pages on the relatively small display of client machine 54, and generate those web-pages in a format that conveys substantially the same information, as if those web-pages had been generated on a traditional desktop browser such as INTERNET EXPLORER® (from Microsoft Corporation, One Microsoft Way, Redmond, Wash.) or FIREFOX® (from Mozilla Foundation, 1981 Landings Drive, Building K, Mountain View, Calif. 94043-0801, USA.). Primary web-browser application 82 thus provides basic HTML and other web-browsing capability, such as JAVASCRIPT™, although subject to features provided in secondary web-browser application 86. Indeed, secondary web-browser application 86 is configured to relieve primary web-browser application 82 of certain scripting functions and the like, as will be discussed in greater detail below. In general, client machine 54 is configured to interact with content available over network 66, including web content on web server 58 via primary web-browser application 82 and secondary web-browser application 86.

Returning again to FIG. 1, web server 58 is configured to host a web-page 90 that includes, in a present embodiment, programming instructions representing context sensitive content 94. Web-page 90 and context sensitive content 94 are configured to be accessible from a traditional desktop browser, such as INTERNET EXPLORER® or FIRE-FOX®. As will be explained in greater detail below, primary web-browser application 82 is configured to access web-page 90 and to provide interaction with context sensitive content 94 via secondary web-browser application 86.

Web server 58 may be based on any well-known server environment including a module that houses one or more central processing units, volatile memory (e.g. random access memory), persistent memory (e.g. hard disk devices) and network interfaces to allow server 58 to communicate over network 66. For example, server 58 may be a SUN FIRE™ V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for server 58 is contemplated.

It should now be understood that the nature of network 66 and the links 70 and 74 associated therewith are not particularly limited and are, in general, based on any combination of architectures that will support interactions between client machine 54 and server 58. In a present embodiment network 66 itself includes the Internet as well as appropriate gateways and backhauls to links 70 and 74. Accordingly, the links 70 and 74 between network 66 and the interconnected components are complementary to functional requirements of those components.

More specifically, link 70 between client machine 54 and network 66 may be based in a present embodiment on core mobile network infrastructure (e.g. Global System for Mobile communications ("GSM"); Code Division Multiple Access ("CDMA"); CDMA 2000; 3G; Evolution-Data Optimized ("EV-DO"), Universal Mobile Telecommunications System ("UMTS"), High Speed Packet Access ("HSPA")) or on wireless local area network ("WLAN") infrastructures such as the Institute for Electrical and Electronic Engineers ("IEEE") 802.11 Standard (and its variants) or BLUETOOTH® or the like or hybrids thereof. Note that in an exemplary variation of system 50 it is contemplated that client machine 54 may be other types of client machines whereby link 70 is a wired connection.

Link 74 may be based on a T1, T3, O3 or any other suitable wired or wireless connection between server 58 and network 66.

Figure 3:
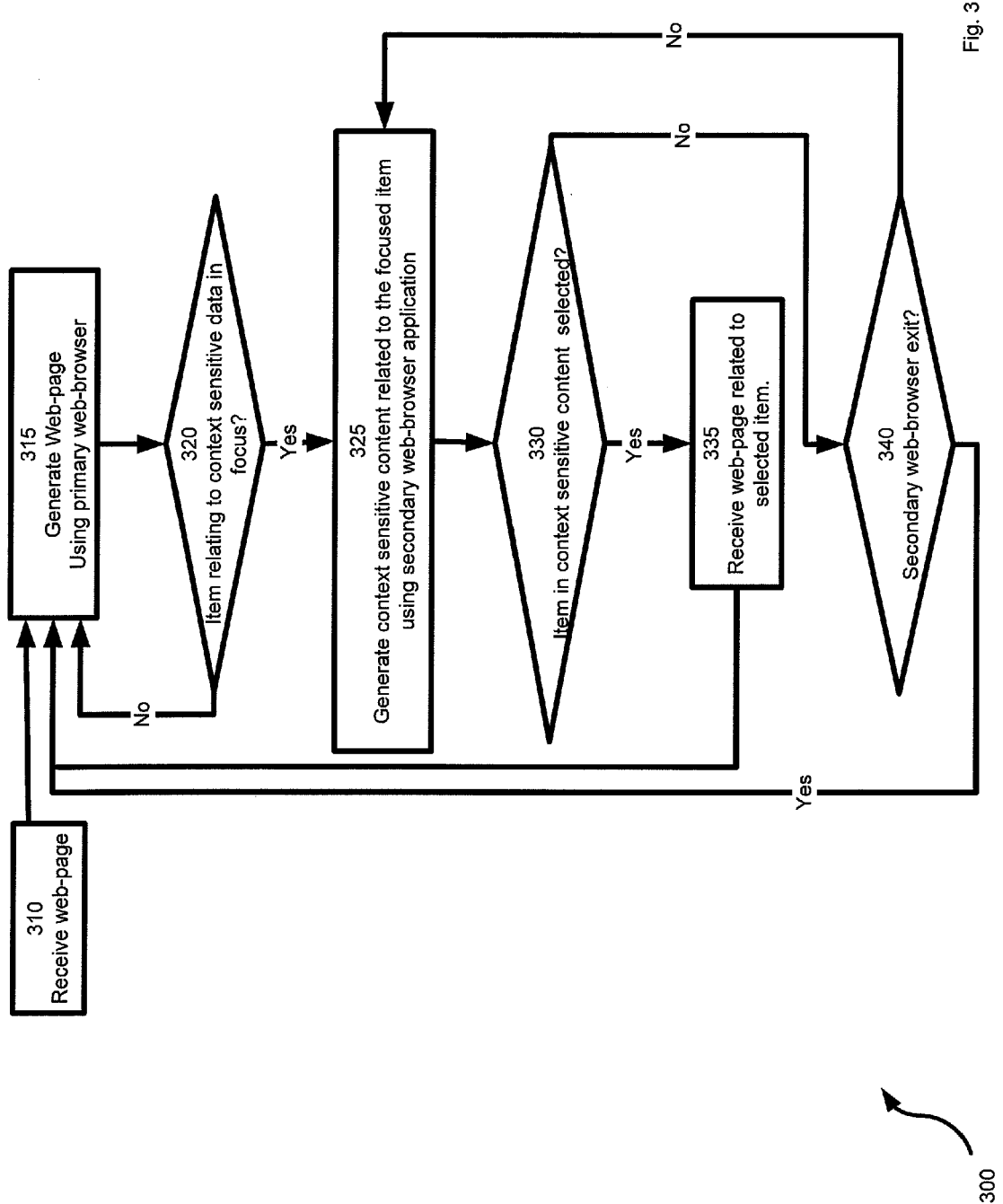
FIG. 3 shows a flow-chart depicting a method of providing context sensitive content.

Referring now to FIG. 3, a method for providing context sensitive content on a computing device is provided in the form of a flow-chart indicated generally at 300. Method 300 will be explained in conjunction with its exemplary performance on system 50, but it should be understood that system 50 and method 300 may be varied within the scope of the present teachings. For example, the method 300 need not be performed in the exact sequence as presented in FIG. 3.

Figure 4:
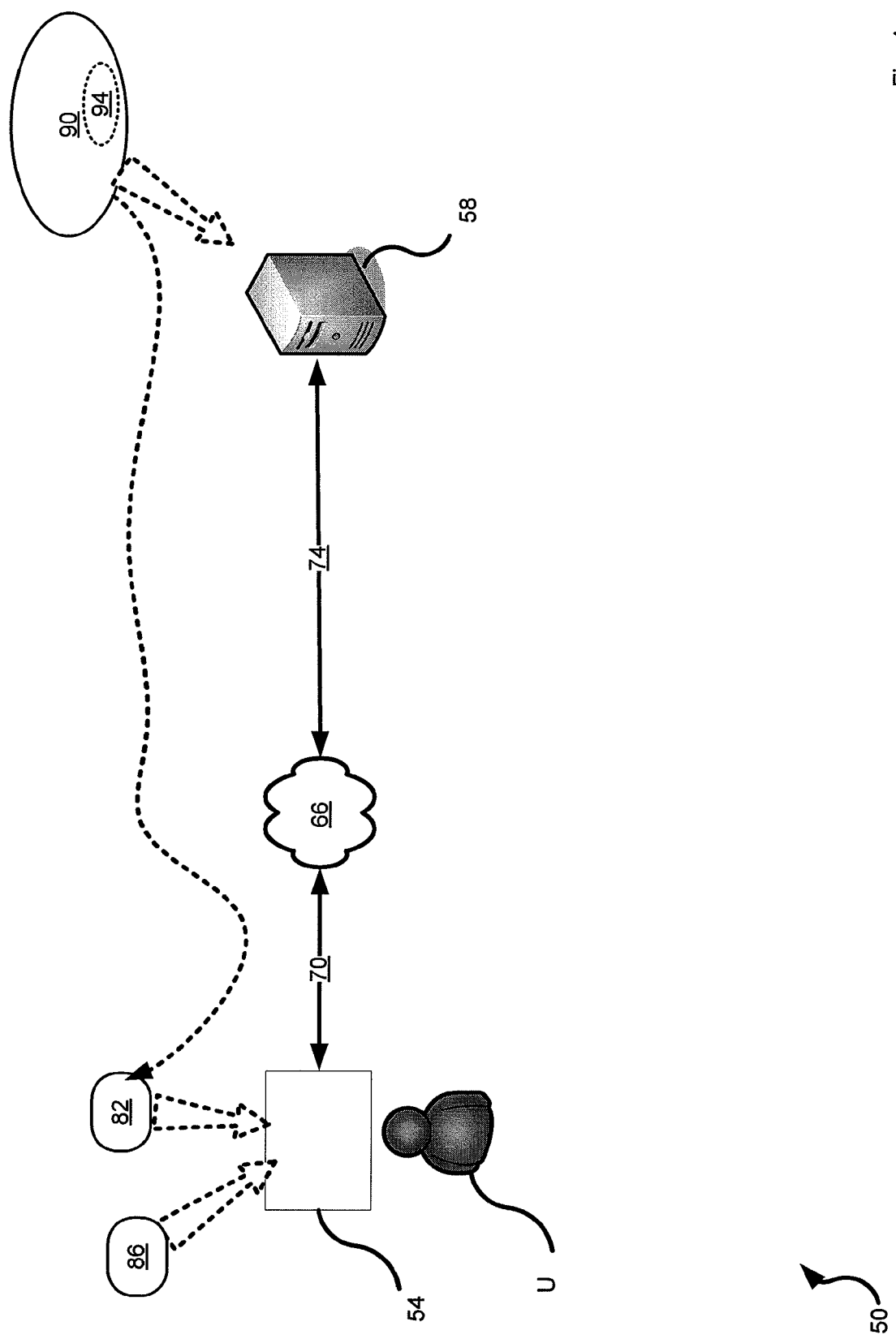
FIG. 4 shows exemplary performance of block 310 on the system of FIG. 1.

Block 310 comprises receiving a web-page. In system 50, block 310 is performed by client machine 54, which accesses web-page 90 via network 66 in the usual manner. In a present embodiment, primary web-browser application 82 retrieves web-page 90 via network 66 from server 58 in the usual manner. Block 310 is represented in FIG. 4 as web-page 90 is shown as downloaded to client machine 54 using primary web-browser application 82. Note that con-text sensitive content 94 is also retrieved as part of this process.

Figure 5:
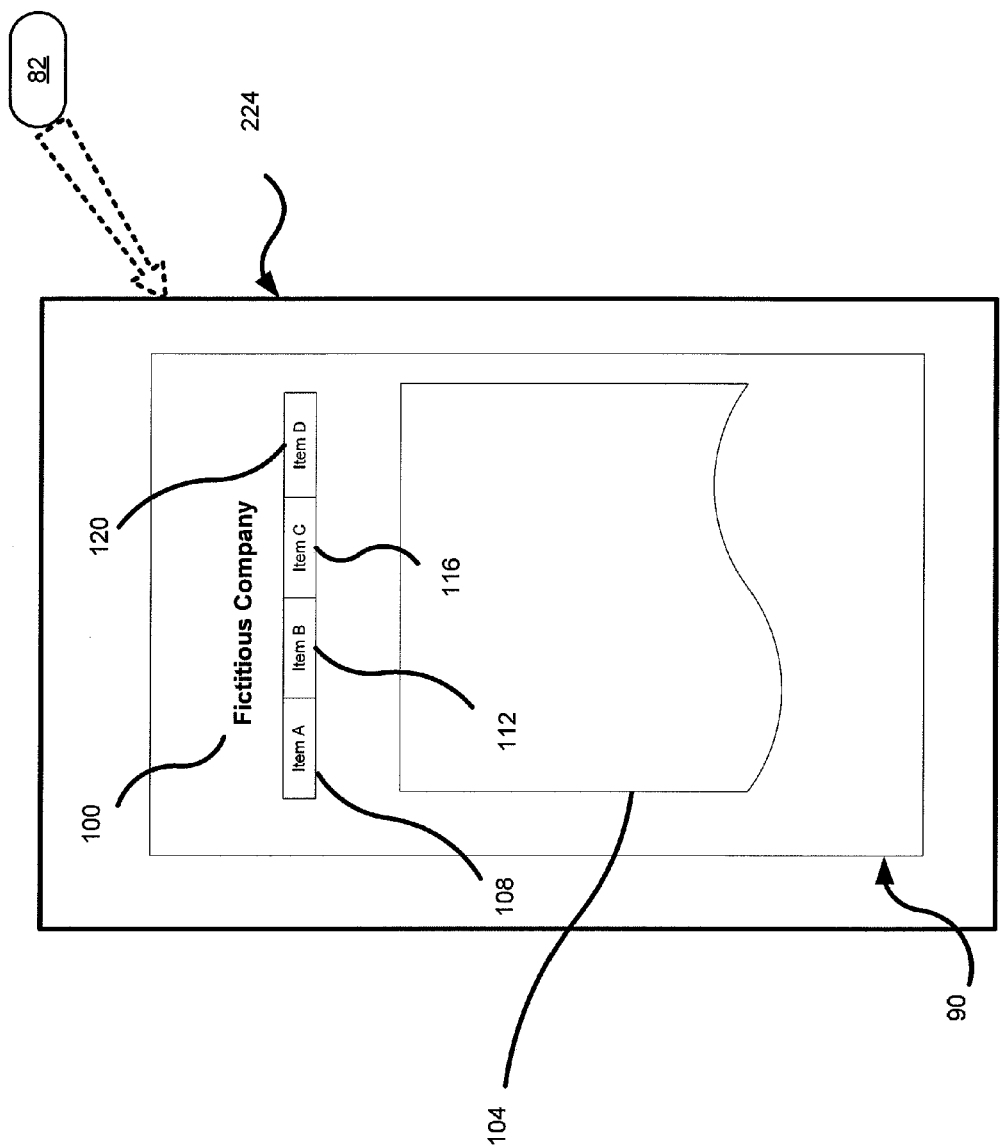
FIG. 5 shows an example of a web-page as generated by a primary web-browser application using the method of FIG. 3.

Block 315 comprises generating a web-page using a primary web-browser application. Primary web-browser application 82 thus generates web-page 90 on display 224. FIG. 5 shows an example of web-page 90 generated on display 224, in the form of a homepage 100 for a fictitious web-site known as "Fictitious Company". Homepage 100 includes static content 104, 108, 112, 116 and a context sensitive item 120. Context sensitive item 120 is related to context sensitive content 94. However, context sensitive content 94 is not shown in FIG. 5 because of the general nature of context sensitive data. Generally, context sensitive data is related to certain items on a web-page. Placing any of these items in focus causes the context sensitive content 94 related to context sensitive item 120 to be displayed. Consequently, if context sensitive item 120 is placed in focus, context sensitive content 94 will be displayed.

(For greater clarity, the term "focus" in this context generally refers to focus as applied to computing, where "focus" is achieved by placing a cursor or other pointing device over an item that is generated on the display of a computing device. An item that is "in focus" has been selected to receive subsequent input. Subsequent input may include a passive action, such as leaving the cursor in focus for a predefined period of time, (e.g. longer than one half of a second) in which case an event will automatically occur, such as generation of a dialogue box respective to context sensitive content 94. Subsequent input may also include an active action, such as a depressing of a key on keyboard 200 or providing a "click" in the context of a computer mouse, which results in generation of the dialogue box or performance of another event respective to context sensitive content 94.)

In the present embodiment, an item is in focus if a cursor is placed on or over an item generated on display 224 for a predefined period of time. (However, it is to be understood that other methods of putting an item in focus are possible.)

In a present embodiment, web-page 90 is generated in substantially the same form as it would be presented on a regular desktop browser, except that web-page 90 itself is reduced in size. Client machine 54 and web-browser application 82 are configured to receive selections of various portions of display 224, and if such selections are activated, then to "zoom in" on such selected portions on display 224 and crop the non-selected portions of web-page 90. Such functionality for web-browser application 82 is currently found in the web-browser currently implemented in the BLACKBERRY BOLD™ client machine from Research In Motion Inc., though to be clear this is a non-limiting example, and this functionality is not required.

Returning again to FIG. 3, block 320 comprises a determination as to whether context sensitive item 120 is in focus. If "no", then method 300 returns to block 315. Note that at block 315, all other operations associated with web-browser application 82 are available, including closing the web-page and thereby terminating method 300 altogether.

On a "yes" determination at block 320, block 325 is invoked. A "yes" determination may be made at block 320 in various ways. As mentioned above, in the present embodiment, an item is in focus if a cursor is placed on or over the item. Consequently, context sensitive item 120 is in focus if pointing device 202 is used to place a cursor on or over context sensitive item 120.

Block 325 comprises generating context sensitive content related to the focused item using a secondary web-browser application 86. Secondary web-browser application 86 is configured to generate a mirrored, but graphically simplified version of the context sensitive data. The graphical simplification may be effected by using text and blank-space, but no graphics, and which may be scrollable across different screens in display 224 (not shown). No JAVA® or other web-based scripts associated with web-page 90 would be executed as part of performance of block 325 and indeed block 325 would be effected in lieu of any such scripts that would normally be associated with web-page 90.

Figure 6:
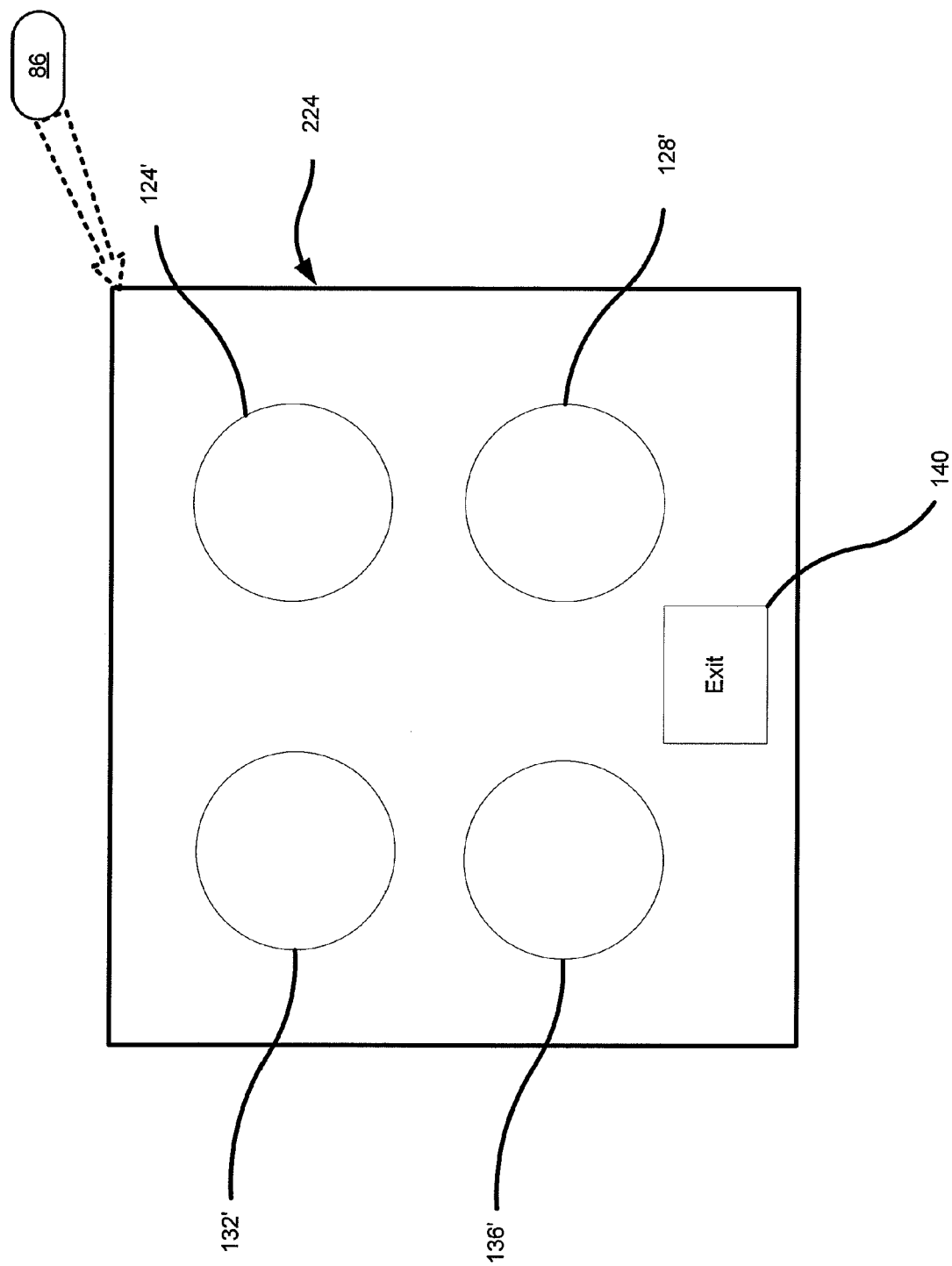
FIG. 6 shows an example of context sensitive data as generated by a secondary web-browser application using the method of FIG. 3.

To better appreciate the effect of block 325, consider the example where context sensitive item 120, is related to context sensitive content 94 and context sensitive content 94 comprises four circles arranged in a two columns by two rows configuration. Performance of block 325 results in the display shown in FIG. 6, as secondary web-browser application 86 displays context sensitive content 94, but in a graphically simplified form in relation to the context sensitive content 94 as maintained on server 58. No JAVA® or other web-based scripts associated with web-page 90 or content 94 are executed by secondary web-browser application 86. FIG. 6 shows an exemplary simplified form of context sensitive content 94 that mirrors context sensitive content 94 and is related to context sensitive item 120, such simplified form of context sensitive content being identified in FIG. 6 as mirrored circles 124', 128', 132', 136'. FIG. 6 also provides an exit button 140 to enable the user to return to the content that was on the screen prior to the user placing context sensitive item 120 (as shown in FIG. 5) into focus.

Referring again to FIG. 3, block 330 comprises a determination as to whether any of context sensitive content (from the above example, circles 124', 128', 132', 136') has been selected.

On a "yes" determination at block 330, block 335 is invoked. A "yes" determination may be made at block 330 in various ways. For example, a cursor placement followed by a definitive input such as depression of a button on keyboard 200, or some other "click" or select function associated with pointing device 202.

Block 335 comprises receiving a web-page related to the context sensitive content (i.e., circles 124', 128', 132', or 136') that had been selected by the user. On completion of executing block 335, method 300 returns to block 315 to generate the web-page.

On a "no" determination from block 330, method 300 advances to block 340.

At block 340, a determination is made to determine whether exit button 140 has been depressed. If "no", method 300 returns to block 325.

On a "yes" determination at block 340, block 315 is invoked. Homepage 100 is displayed as shown in FIG. 5.

Figure 7:
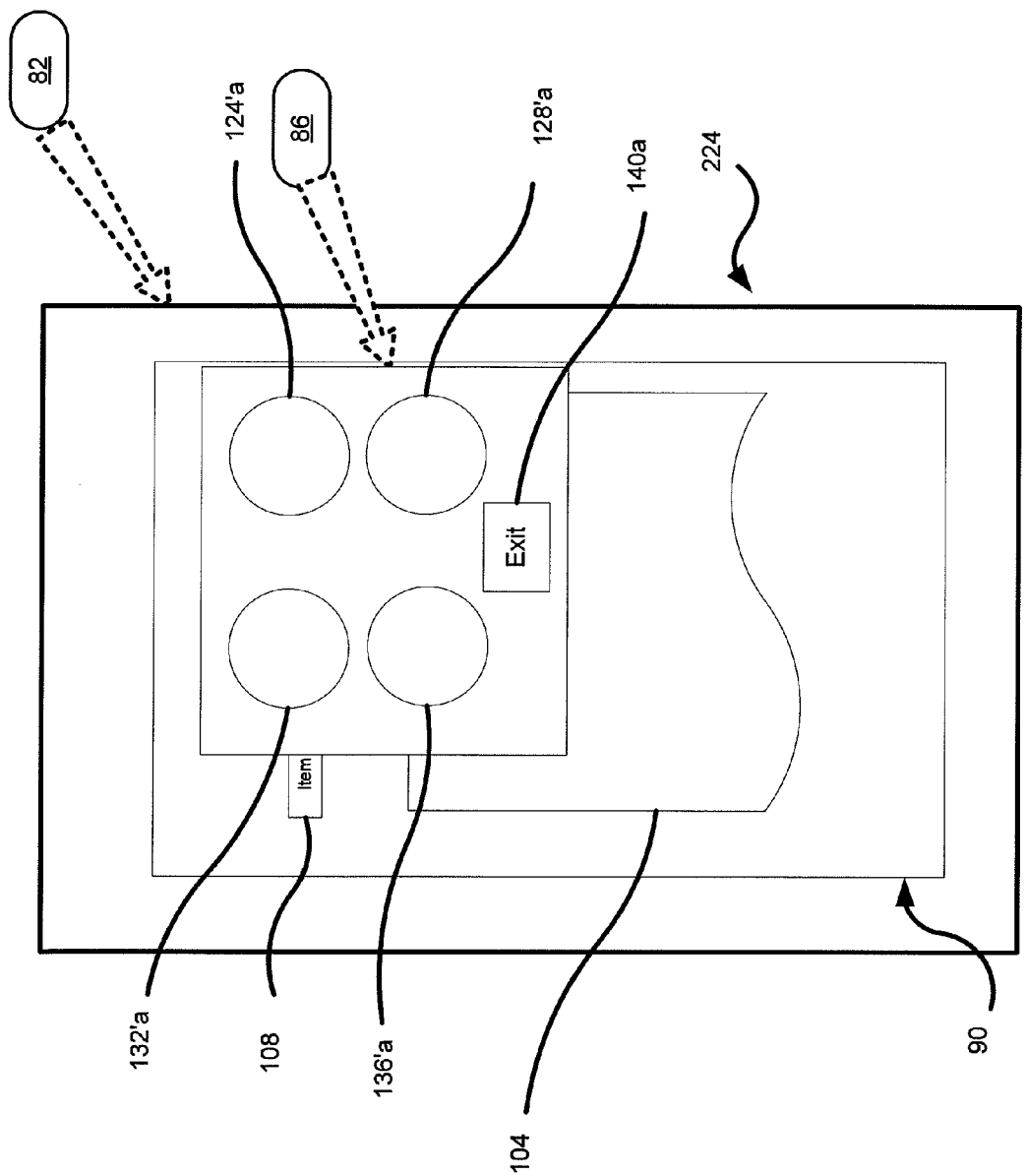
FIG. 7 shows another example of context sensitive data as generated by a secondary web-browser application using the method of FIG. 3.

It should be understood that variations, subsets and combinations thereof are contemplated. For example, it is to be understood that the example in FIG. 6 is non-limiting. FIG. 7 shows a variation on FIG. 6 as an alternative version of performance of block 325. In FIG. 7, circles 124', 128', 132', 136' and exit button 140 from FIG. 6 are shown as circles 124'a, 128'a, 132'a, 136'a and exit button 140a, respectively. In FIG. 7, secondary browser 86 is shown displaying circles 124'a, 128'a, 132'a, 136'a and exit button 140a on top of a portion of the contents of web-page 90.

Figure 8:
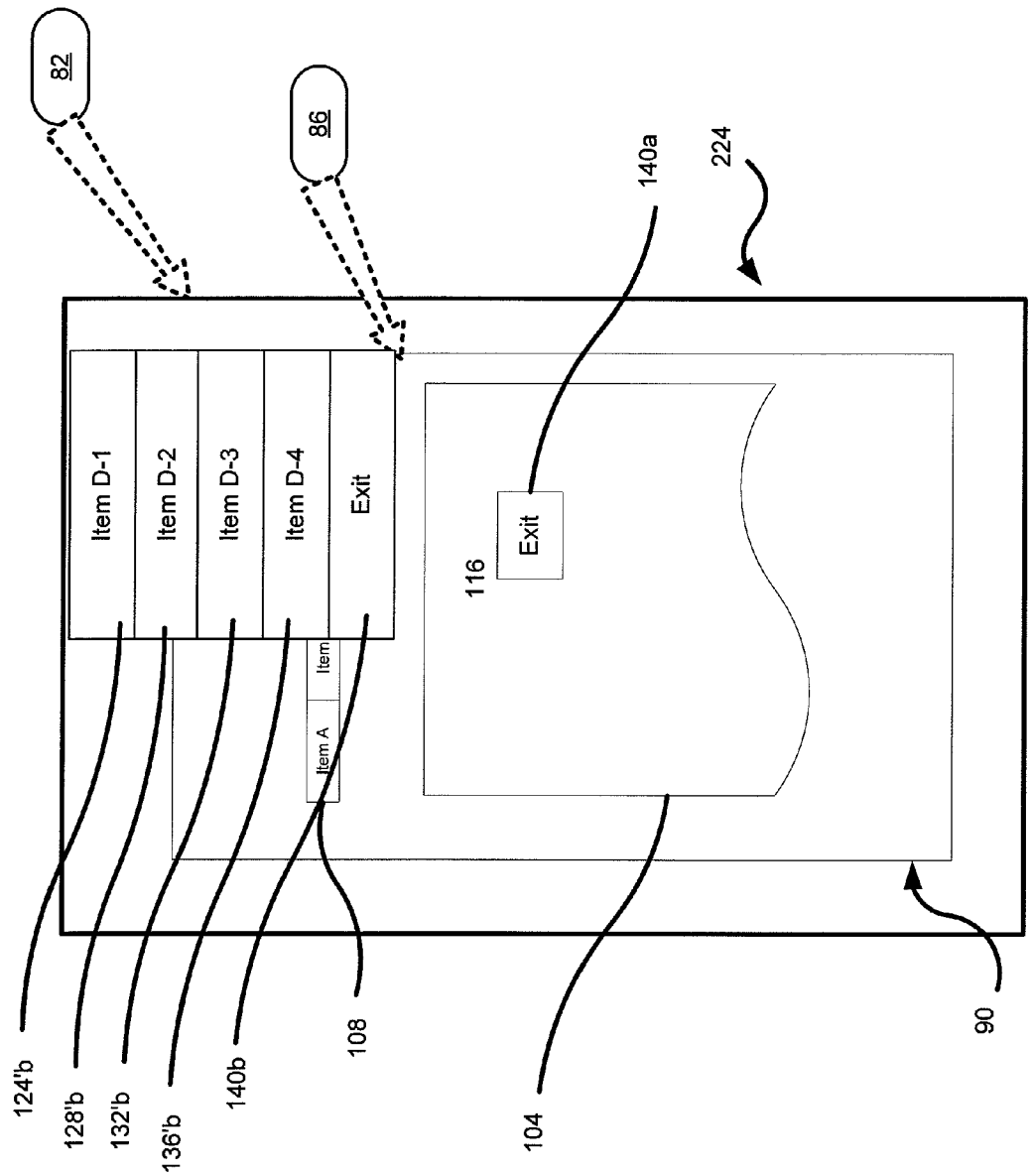
FIG. 8 shows another example of context sensitive data as generated by a secondary web-browser application using the method of FIG. 3.

FIG. 8 shows a further variation on FIG. 6 as an alternative version of performance of block 325. In FIG. 8, circles 124', 128', 132', 136' and exit button 140 from FIG. 6 are generated as menu entries 124'b, 128'b, 132'b, 136'b and exit entry 140b, respectively. In FIG. 8, secondary browser 86 is implemented utilizing the menu application that is native to client machine 54. Such a native menu application is already configured to provide menu selections in all applications within client machine 54, and is invoked at block 325 to provide menu entries that correspond to context sensitive content 94. Such a native menu application is also discussed in PCT/CA2008/000903, entitled "System and Method for Content Navigation" having a filing date of May 12, 2008, the contents of which are incorporated herein by reference.

Figure 9:
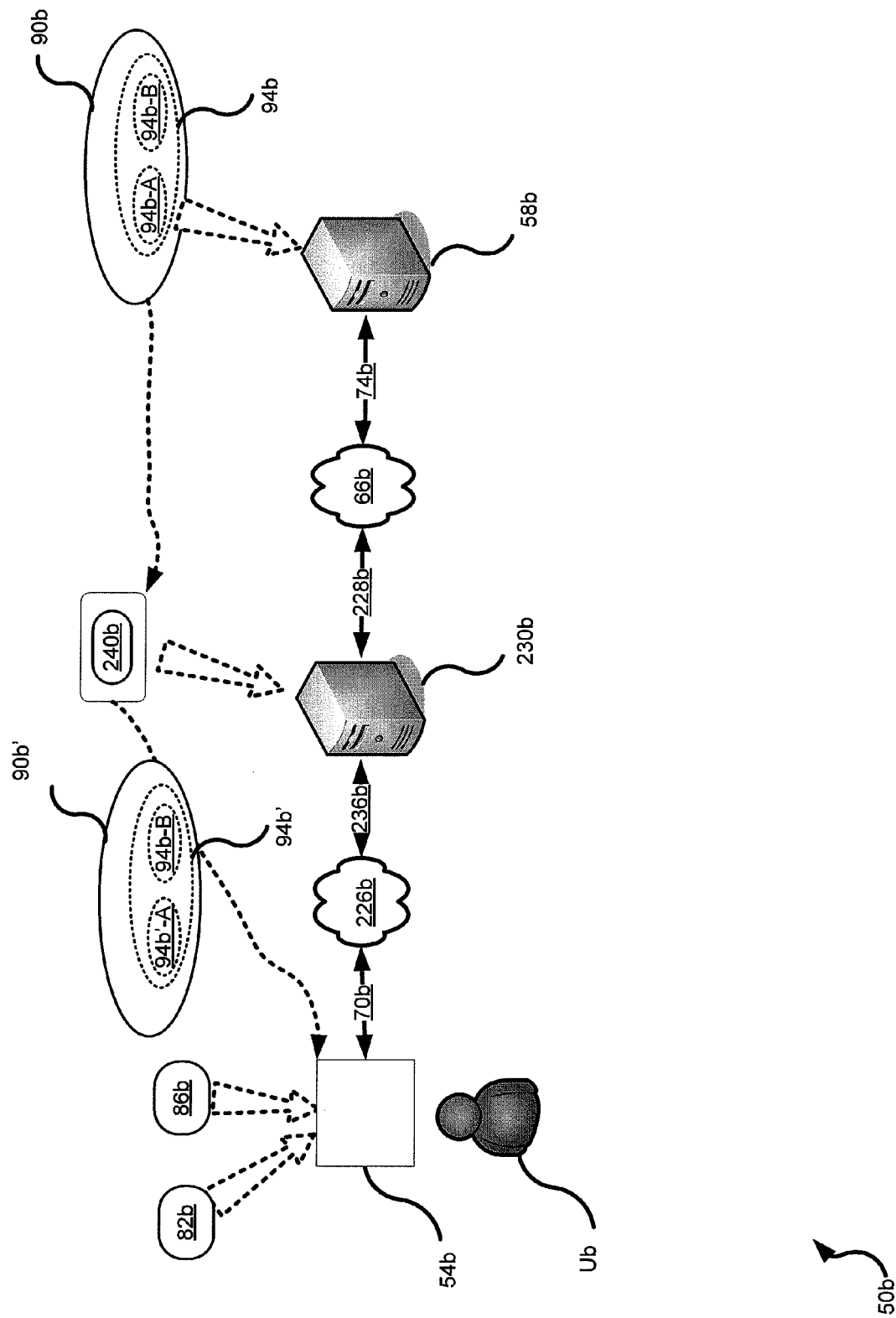
FIG. 9 is a schematic representation of another embodiment of a system for providing context sensitive content on a computing device.

Referring now to FIG. 9, a system for providing context sensitive content on a computing device in accordance with another embodiment is indicated generally at 50b. System 50b further elaborates on non-limiting exemplary ways in which the teachings in relation to system 50 can be implemented. Thus, system 50b is a variant of system 50 and accordingly like elements in system 50b bear like reference characters to elements in system 50, except followed by the suffix "b".

Of note is that system 50b includes an intermediate server 230b, a second network 226b connecting server 230b to device 54b. An additional link 236b connects network 226b to server 230b, and another additional link 228b connects intermediate server 230b to network 66b.

Also of note in system 50b, context sensitive content 94b is shown in more detail as compared to context sensitive content 94. Context sensitive content 94b thus comprises a script portion 94b-A and a data portion 94b-B. Script portion 94b-A comprises programming instructions, such as DHTML or JAVASCRIPT™, which are executable by a desktop browser application in order to provide animations, graphics or other rendering instructions, whereas data portion 94b-B comprises tags, labels, or text associated with the animations, graphics or other rendering instructions. As a specific example, script portion 94b-A can include programming instructions to generate circles on various portions at various locations of a display whereas data portion 94b-B can comprise text that is generated within each of those circles. Script portion 94b-A can also be considered the non-data portion of context sensitive content 94, Also of note in system 50b, is that intermediate server 230b comprises a transcoding engine 240b. Transcoding engine 240b is configured to generate a modified version of web-page 90b' whereby script portion 94b-A is removed from content 94b, and replaced with an alternative instruction set 94b'-A corresponding to the programming functionality inherent to secondary web-browser application 86b. It is also contemplated that secondary web-browser application 86b itself, is optimized for the programming instructions native to processor 208 (e.g. machine language programming instructions), and to the other unique hardware characteristics of device 54b, such as the screen size and resolution of display 224, and the various types of inputs that can be received via keyboard 200 or pointing device 202. Modified version of web-page 90b' thus comprises modified context sensitive content 94b', which itself comprises alternative instruction set 94b'-A, but also includes the original data portion 94b-B as stored on server 58b.

Various advantages will now be apparent. First, where alternative instruction set 94b'-A is smaller than script portion 94b-A, the overall size of modified version of web-page 90b' may be smaller than original web-page 90b, and therefore web-page 90b' will consume less bandwidth than original web-page 90b. Further, since alternative instruction set 94b'-A corresponds to programming functionality inherent to secondary web-browser application 86b, the resources of processor 208 or storage 212 or storage 216 or all of them are more efficiently utilized.

Figure 10:
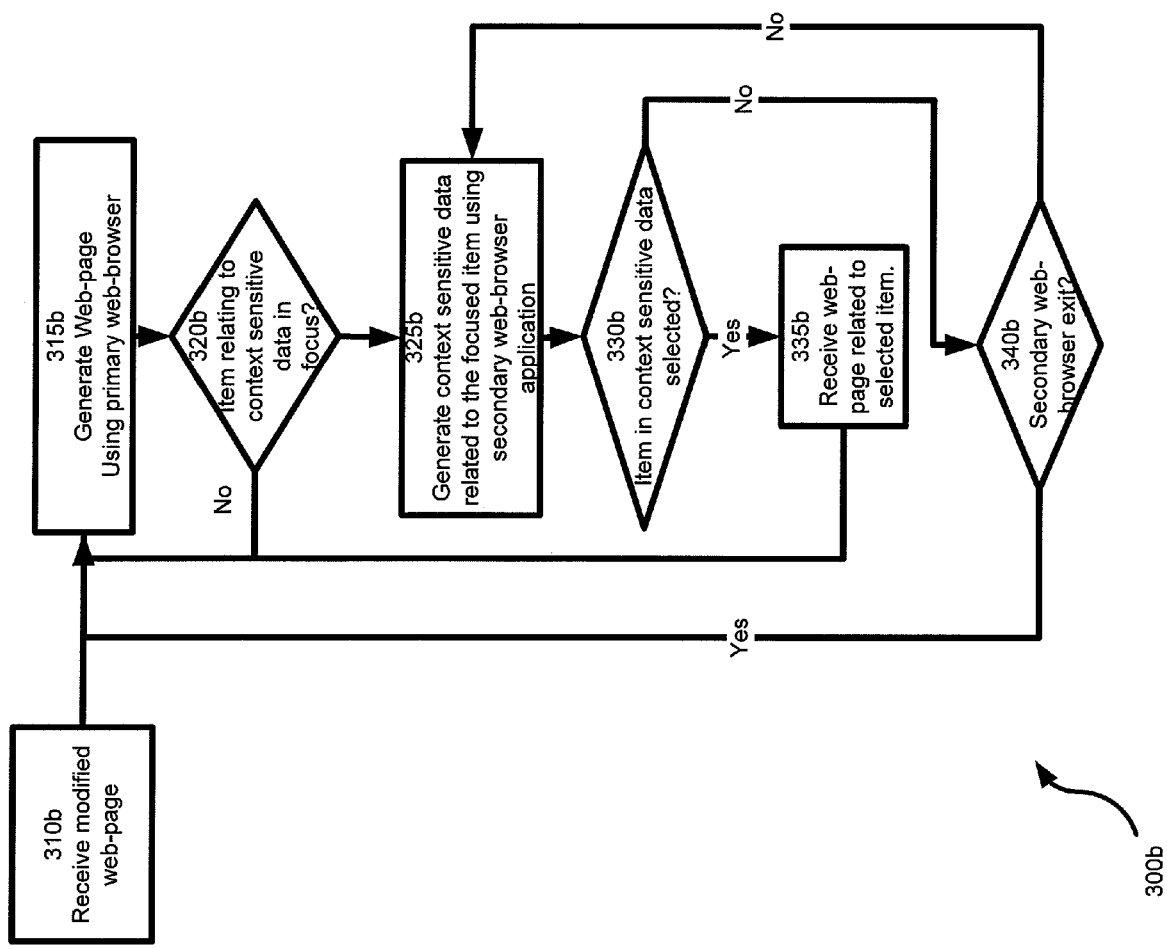
FIG. 10 shows a flow-chart depicting a method of providing context sensitive content in accordance with another embodiment.

Method 300 may also be performed using system 50b, however FIG. 10 shows a modified version of method 300 as method 300b. Method 300b is substantially the same as method 300, except that in method 300b, block 310b differs from block 310, in that at block 310b a modified version of the requested web-page is received. In the example above, the modified version of the web-page received at block 310b corresponds to modified version of web-page 90b'.

Figure 11:
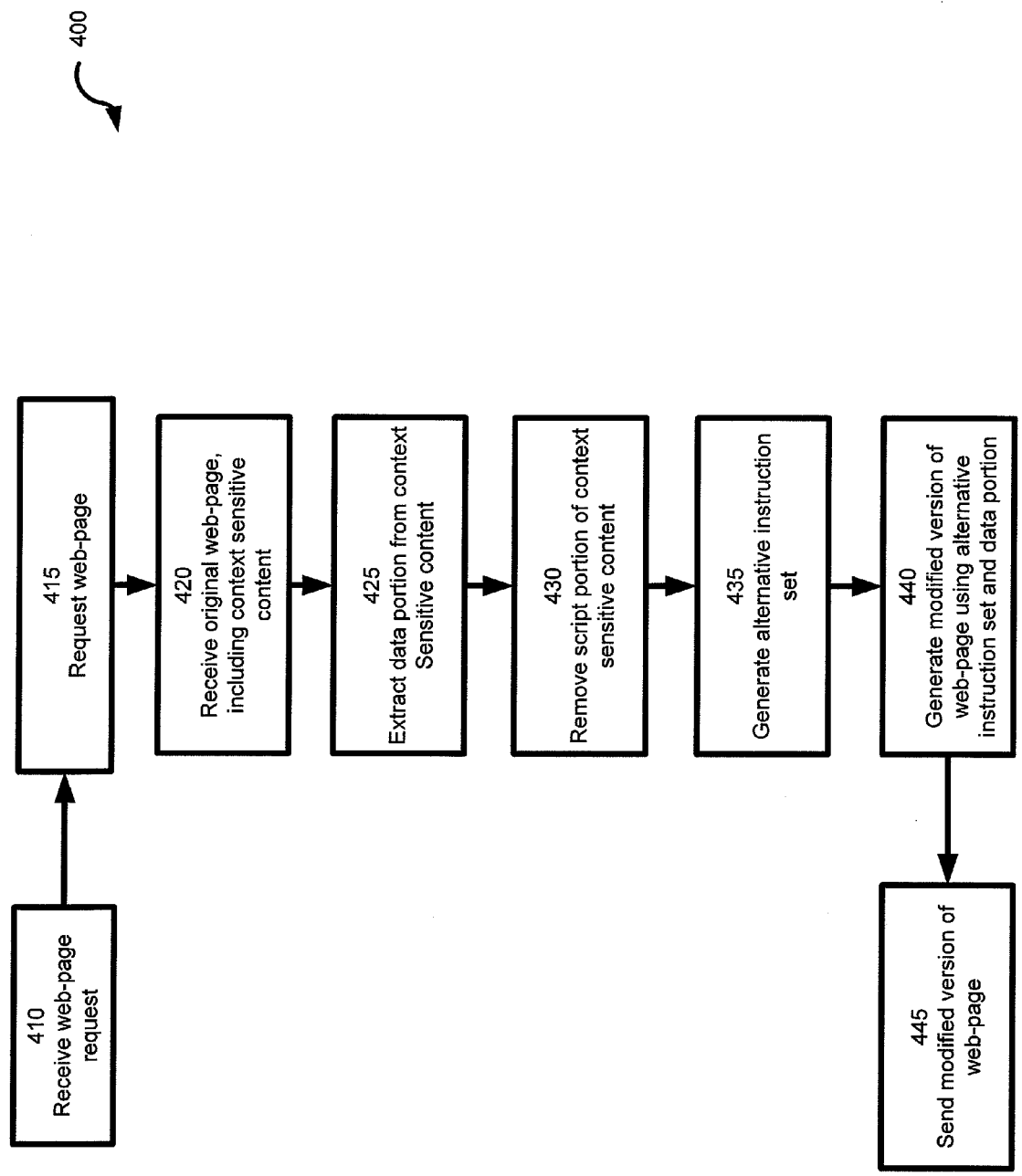
FIG. 11 shows a flow-chart depicting a method of generating a modified version of a web-page that includes context sensitive content.

Referring now to FIG. 11, a method for generating a modified version of a web-page is depicted in the form of a flowchart generally indicated at 400. Method 400 can be performed by server 230b of system 50b, and thus at block 410 a request for a web-page is received. Block 410 is effected by device 54b sending a request for web-page 90b from server 58b, however the request is actually received by server 230b.

Block 415 comprises requesting the web-page that corresponds to the request at block 410. In system 50b, server 230b requests web-page 90b from server 58b and at block 420, web-page 90b, which includes context sensitive content 94b, is received at server 230b, as represented in FIG. 9.

Block 425 comprises extracting the data portion from the context sensitive content from the web-page received at block 420. In the example of FIG. 9, server 230b thus extracts data portion 94b-B from content 94b. Block 425 can be effected in various ways. One way of effecting block 425 is for transcoding engine 240b to parse content 94b to identify portions of content 94b that are associated with known programming instructions commonly associated with scripts, and therefore correspond to script portion 94b-A. Likewise transcoding engine 240b may identify portions of content 94b that would NOT be associated with programming instructions but would instead correspond to tags, labels or text and which would therefore correspond with data portion 94b-B. Another way of effecting block 425 can be based on comments or other identifiers embedded within context sensitive content 94b that clearly distinguish between script portion 94b-A and data portion 94b-B.

Block 430 comprises removing the script portion of the context sensitive content. In the example of FIG. 9, server 230b thus removes (e.g. deletes) script portion 94b-A from content 94b. The determinations made as discussed in relation to block 425 could be used to actually remove the identified script portion 94b-A.

Block 435 comprises generating an alternative instruction set. In the example of FIG. 9, server 230b thus generates alternative instruction set 94b'-A as discussed above.

Block 440 comprises generating a modified version of the web-page requested at block 410, using the alternative instruction set from block 435 and the data portion extracted at block 425. In the example of FIG. 9, server 230b thus generates modified version of web-page 90b' as discussed above.

Block 445 comprises sending the modified version of the web-page, as generated at block 440, in response to the request at block 410. In the example of FIG. 9, server 230b thus sends modified version of web-page 90b' to device 54b.

It should be apparent now that the present embodiment further reduces the network traffic going to and from client machine 54b and also reduces the use of processing resources of client machine 54b.

As an exemplary real-world implementation of system 50b, intermediate server 230b may be part of Mobile Data Services (MDS) implemented within a Blackberry Internet Server (BIS) or a Blackberry Enterprise Server (BES) from Research in Motion Inc. According to the example in FIG. 9, server 230b is thus configured to parse web-page 90b according to how web-page 90b is maintained on server 58b, and to generate modified web-page 90b' corresponding to the unique configuration of device 54b.

Figure 12:
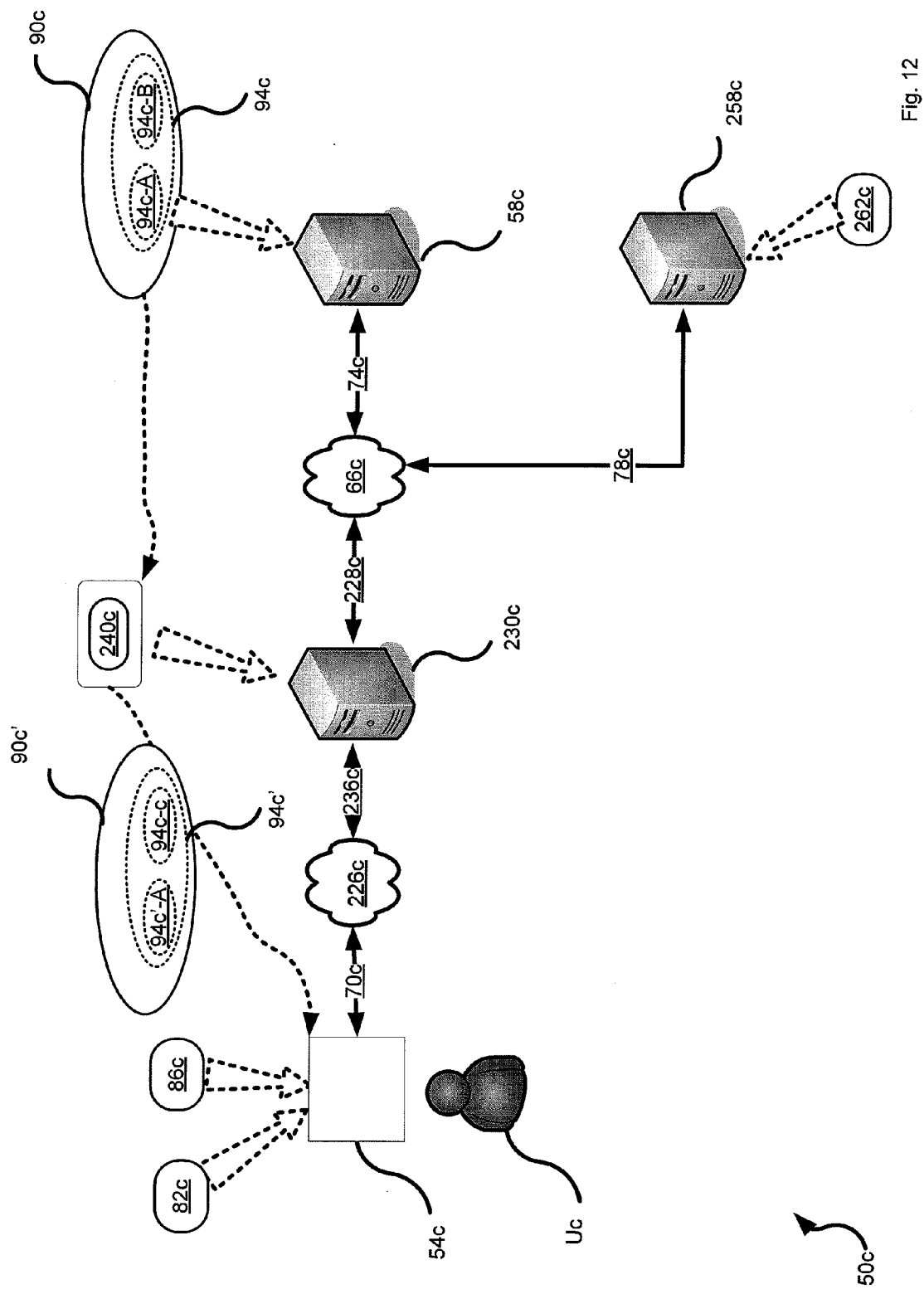
FIG. 12 is a schematic representation of another embodiment of a system for providing context sensitive content on a computing device.

It is contemplated that system 50 and system 50b can be scaled to accommodate a plurality of different client machines and web servers. Indeed, it may be desired to scale system 50b (or system 50) to accommodate a plurality of different web servers hosting different web pages, and to accommodate a plurality of different types of client machines having different computing environments, such as different types of processors, different sizes of displays and resolutions. One way of accommodating such scaling is shown in FIG. 12, which includes a system for providing context sensitive content on a computing device in accordance with another embodiment that is indicated generally at 50c. It should be understood that system 50c further elaborates further non-limiting exemplary ways in which the teachings in relation to system 50 or system 50b can be implemented. Thus, system 50c is a variant of system 50b and accordingly like elements in system 50c bear like reference characters to elements in system 50b, except followed by the suffix "c".

Figure 13:
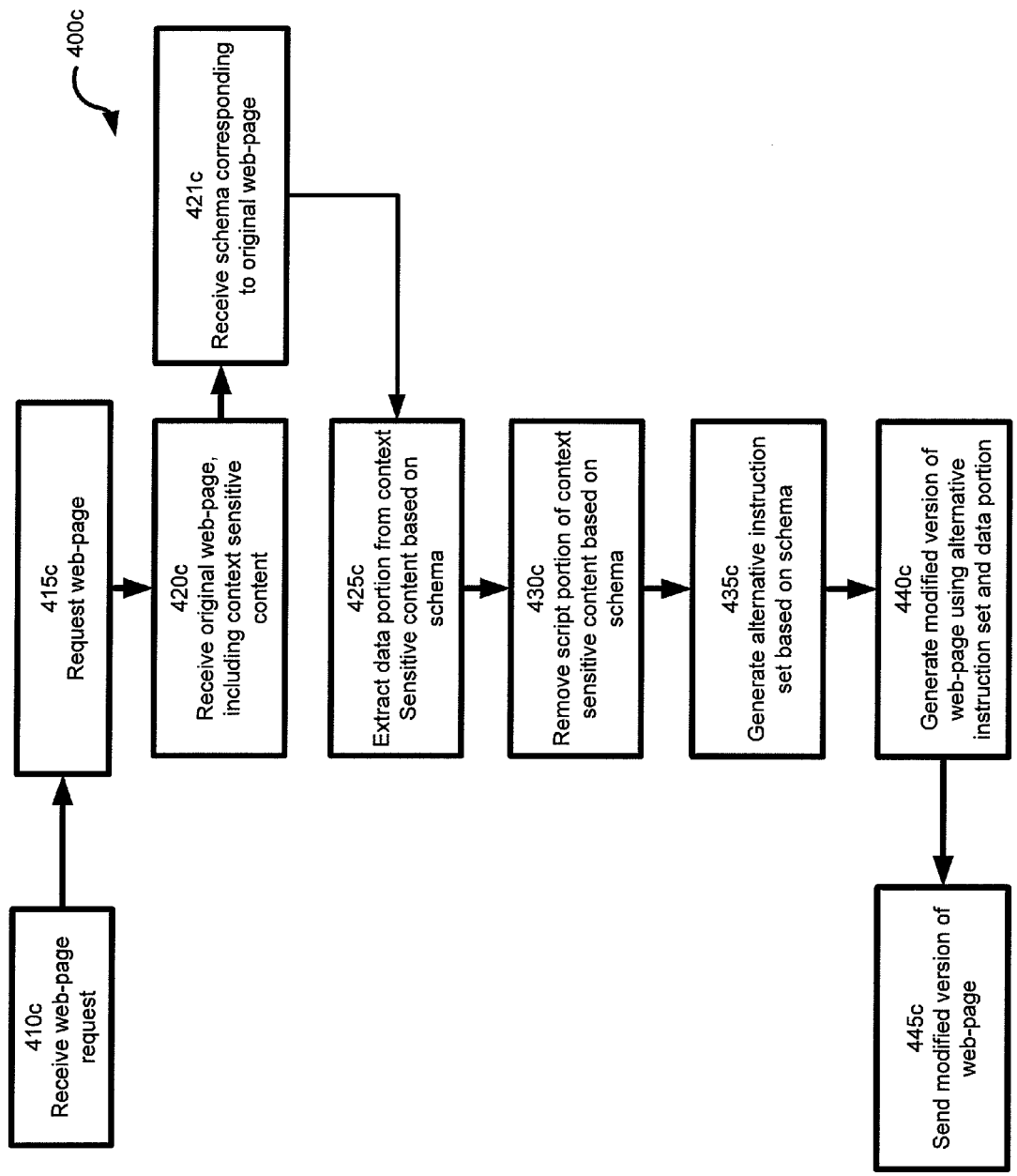
FIG. 13 shows a flow-chart depicting a method of generating a modified version of a web-page that includes context sensitive content.

Of note is that system 50c further comprises a schema server 258c which stores a schema 262c that is complimentary to web-page 90c. (Such a schema server is also discussed in PCT/CA2008/000903, entitled "System and Method for Content Navigation" having a filing date of May 12, 2008). Schema 262c is thus uniquely configured for use by intermediate server 230c to assist intermediate server 230c in the identification of script portion 94c-A and data portion 94c-B. Configuration of schema 262c can include, for example, unique strings of code or other identifiers that are expected in context sensitive content 94c to enable identification of script portion 94c-A and data portion 94c-B. FIG. 13, thus shows method 400c, a variation of method 400, which can be performed by server 230c. Of note is that in method 400c, block 421c is provided which comprises the receipt of the schema corresponding to the original web-page requested at block 410c. Also of note is that in method 400c, block 425c, block 430c and block 435c are performed based on data found in the schema received at block 421c.

It is to be understood that combinations, variations and subsets of the various embodiments are contemplated. For example, system 50 can be varied to utilize schema 262c and obviate intermediate server 230c. In this variation, block 325 of method 300 may be effected by directly loading schema 262c onto client machine 54 and which is used by client machine 54 to extract the data portion of the context sensitive content and perform the remainder of method 300 without using the original script portion of the context sensitive content. As another example, it should be understood that block 325 of method 300c can be effected using the discussion in relation to block 425 of method 400, such that once the data portion is extracted from the context sensitive content, then secondary web-browser application 86 can use the extracted data portion in the remainder of the performance of method 300.

As another variation, the schema server of system 50c can be eliminated, such that schema 262c is stored on server 58c or server 230c.

In addition to other advantages already discussed, various other advantages will now be apparent. For example, Web-page 90 (or its variant web-page 90b) may be accessed and navigated on client machine 54 without programming changes to web-page 90. Further, such access and navigation on client machine 54 makes good use of computing resources on client machine 54.

These advantages address limitations that arise acutely when web-pages are programmed with an emphasis on the desktop browsing experience, where Internet traffic bandwidth, computing processing resources, and screen area are less constrained than in the portable computing device mini-browsing experience. These desktop optimized web-pages often do not generate well on portable computing devices, which have access to less bandwidth than desktop wired devices, fewer processing and memory resources, and restricted screen sizes. Additionally, in desktop optimized web-pages JAVASCRIPT™ is liberally employed for such context sensitive items content and context sensitive items, and yet support for JAVASCRIPT™ may be limited on portable computing devices. Furthermore, context sensitive content as optimized for the larger screens employed in desktop computing may have graphical generation instructions that are anathema to the smaller screens common in minibrowser optimizations. The smaller screens may generate the underlying web-pages with context sensitive items well, but then poorly generate the context sensitive content. This may lead to poor generation of context sensitive items as such generation is at odds with the minibrowser optimized display of the underlying web-page.

Those skilled in the art are to understand that subsets, combinations and variations of the foregoing are contemplated. The circles 124, 128, 132, and 136 are but one example of what context sensitive content 94 may be. For example, context sensitive content 94 may include text, graphics, a list, a table, pictures, or videos or a subset thereof. The claims attached hereto define the scope of the monopoly sought.

The invention claimed is:

1. An electronic device comprising:
   storage configured to maintain a primary web-browser application and a secondary web-browser application;
   at least one processor connected to said storage and configured to execute said primary web-browser application;
   an interface connected to said processor, said processor configured to receive a web-page stored at a web-server via said interface, said web-page including context sensitive content related to a plurality of context sensitive items on said web-page, said context sensitive content being able to change without further input from the web-server, said context sensitive content comprising a data portion and a non-data portion, said non-data portion comprising scripts executable by said primary web-browser application and said data portion comprising tags, labels, or text;
   a display connected to said processor; said processor further configured to render said web-page on said display;
   an input device connected to said processor, said processor configured to receive focus on one of said plurality of context sensitive items via said input device placing a pointer over the one context sensitive item;
   said processor further configured to respond to receiving the focus by rendering only the tags, labels, or text constituting the data portion of the context sensitive content related to said one of the plurality of context sensitive items on said display via the secondary web-browser application; and
   said processor further configured to not execute said scripts associated with said context sensitive content using said secondary web-browser application.

2. The electronic device of claim 1, wherein the receiving focus comprises placing a pointer over one of said plurality of context sensitive items.

3. The electronic device of claim 1, wherein the receiving focus comprises placing a pointer over one of said plurality of context sensitive items for a predetermined duration of time.

4. The electronic device of claim 1 wherein the processor is further configured to receive a subsequent input from the input device after receiving focus.

5. The electronic device of claim 1 wherein said processor is configured to parse said context sensitive content to extract said data portion.

6. The electronic device of claim 1 wherein said processor is configured to access said web-page at said web-server through an intermediate server, and wherein said intermediate server is configured to send a modified version of said web-page.

7. The electronic device of claim 6 wherein said modified version of said web-page does not include said non-data portion from said context sensitive content.

8. The electronic device of claim 6 wherein said modified version of said web-page replaces said non-data portion with an alternative instruction set comprised of programming instructions inherent to said secondary web-browser application.

9. The electronic device of claim 1 wherein said primary web-browser application is configured to emulate a desk-top browser.

10. The electronic device of claim 1 wherein said secondary web-browser application is optimized for programming instructions native to said processor.

11. The electronic device of claim 1 wherein said secondary web-browser application is optimized to hardware characteristics associated with a screen size and resolution of said display.

12. The electronic device of claim 1 wherein said secondary web-browser application is optimized to different input devices of said portable computing device.

13. A method of providing context sensitive content on an electronic device, the method comprising:
    receiving, at a processor of said portable computing device, a web-page stored on a server, said web-page including context sensitive content related to a plurality of context sensitive items, said context sensitive content being able to change without further input from the server, said context sensitive content comprising a data portion and a non-data portion, said non-data portion comprising scripts executable by said a primary web-browser and said data portion comprising tags, labels or text;
    rendering on a display of the electronic device, via said processor, said web-page executing a primary web-browser application;
    receiving, through an input device connected to said processor placing a pointer over one of the plurality of context sensitive items, focus on said one of said plurality of context sensitive items; and
    responding to receiving the focus by rendering on the display of the electronic device-via said processor, only the tags, labels, or text constituting the data portion of the context sensitive content related to said one of the plurality of context sensitive items by executing a secondary web-browser application, said secondary web-browser not executing said scripts associated with said context sensitive content.

14. The method of claim 13, wherein the receiving focus comprises placing a pointer over one of said plurality of context sensitive items using said input device.

15. The method of claim 13, wherein the receiving focus comprises placing a pointer over one of said plurality of context sensitive items for a predetermined duration of time using said input device.

16. The method of claim 13 wherein the receiving of focus further comprises receiving further input from the input device of said computing device.

17. The method of claim 13 further comprising parsing said context sensitive content, using said processor, to extract said data portion.

18. The method of claim 13 wherein said web-page is received through an intermediate server, and wherein said intermediate server is configured to send a modified version of said web-page such that said modified version of said web-page is received as part of said receiving.

19. The method of claim 18 wherein said modified version of said web-page does not include said non-data portion from said context sensitive content.

20. The method of claim 18 wherein said modified version of said web-page replaces said non-data portion with an alternative instruction set comprised of programming instructions inherent to said secondary web-browser application.

21. The method of claim 13 wherein said primary web-browser application is configured to emulate a desk-top browser.

22. The method of claim 13 wherein said secondary web-browser application is optimized for programming instructions native to said processor.

23. The method of claim 13 wherein said secondary web-browser application is optimized to hardware characteristics associated with a screen size and resolution of said display.

24. The method of claim 13 wherein said secondary web-browser application is optimized to different input devices of said portable computing device.

25. A non-transitory computer readable storage medium configured to maintain a plurality of programming instructions for a processor of an electronic device, said processor configured to execute said programming instructions to perform the method of:
    receiving a web-page from a server, said web-page including context sensitive content related to a plurality of context sensitive items, said context sensitive content being able to change without further input from the server, said context sensitive content comprising a data portion and a non-data portion, said non-data portion comprising scripts executable by said a primary web-browser and said data portion comprising tags, labels or text;
    rendering said web-page on a display by executing a primary web-browser application;
    receiving focus on one of said plurality of context sensitive items via an input device placing a pointer over the one context sensitive item; and
    respond to receiving the focus by rendering only the tags, labels, or text constituting the data portion of the context sensitive content related to said one of the plurality of context sensitive items on the display by executing a secondary web-browser application, said secondary web-browser not executing said scripts associated with said context sensitive content.

* * * * *